United States Patent
Saisan et al.

(10) Patent No.: US 8,335,346 B2
(45) Date of Patent: Dec. 18, 2012

(54) IDENTIFYING WHETHER A CANDIDATE OBJECT IS FROM AN OBJECT CLASS

(75) Inventors: Payam Saisan, Santa Monica, CA (US); Shubha L. Kadambe, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 1179 days.

(21) Appl. No.: 12/049,830

(22) Filed: Mar. 17, 2008
(Under 37 CFR 1.47)

(65) Prior Publication Data

US 2009/0060353 A1 Mar. 5, 2009

Related U.S. Application Data

(60) Provisional application No. 60/896,636, filed on Mar. 23, 2007.

(51) Int. Cl.
*G06K 9/00* (2006.01)
(52) U.S. Cl. .................................................. 382/103
(58) Field of Classification Search .......... 382/100–107; 348/81–83, 163–170; 367/88, 99, 131–138; 342/22, 195
See application file for complete search history.

(56) References Cited

U.S. PATENT DOCUMENTS

| | | | |
|---|---|---|---|
| 4,951,268 A | 8/1990 | Grall | |
| 5,181,254 A | 1/1993 | Schweizer et al. | |
| 5,937,078 A | 8/1999 | Hyland et al. | |
| 6,700,833 B2 | 3/2004 | Erikson | |
| 6,842,401 B2 | 1/2005 | Chiang et al. | |
| 6,854,410 B1 | 2/2005 | King et al. | |
| 6,868,041 B2 | 3/2005 | Preston et al. | |
| 7,343,362 B1 * | 3/2008 | Flippen, Jr. | 706/20 |
| 2003/0046068 A1 | 3/2003 | Perronnin et al. | |
| 2003/0095140 A1 | 5/2003 | Keaton et al. | |
| 2004/0066966 A1 * | 4/2004 | Schneiderman | 382/159 |
| 2005/0058021 A1 | 3/2005 | Feintuch et al. | |
| 2005/0220191 A1 | 10/2005 | Choi et al. | |
| 2006/0067573 A1 * | 3/2006 | Parr et al. | 382/154 |
| 2006/0110046 A1 | 5/2006 | Luo | |
| 2008/0107311 A1 | 5/2008 | Huang et al. | |
| 2008/0260239 A1 | 10/2008 | Han et al. | |
| 2009/0232406 A1 | 9/2009 | Saisan et al. | |

OTHER PUBLICATIONS

Notification of transmittal of the International Search Report dated Jul. 2, 2008 PCT/2008/057423.
The International Search Report dated Jul. 2, 2008 PCT/2008/057423.
Written Opinion of the International Searching Authority dated Jul. 2, 2008 PCT/2008/057423.

(Continued)

*Primary Examiner* — Atiba O Fitzpatrick
(74) *Attorney, Agent, or Firm* — Daly, Crowley, Mofford & Durkee, LLP

(57) ABSTRACT

In one aspect, a method to identify a candidate object includes receiving an image of the candidate object and projecting the received image onto an image subspace. The image subspace is formed from images of known objects of a class. The method also includes determining whether the candidate object is in the object class based on the received image and the image subspace using a likelihood ratio. The likelihood ratio includes a first probability density indicating a probability an object is in the object class and a second probability density indicating a probability an object is not in the class. The first probability density and the second probability are each a function of a distance of the received image to the image subspace.

21 Claims, 8 Drawing Sheets

OTHER PUBLICATIONS

Anuj Srivastava et al: "Statistical Shape Models Using Elastic-String Representations" Computer Vision—ACCV 2006 Lecture Notes in Computer Science; LNCS, Springer-Verlag, BE, vol. 3851, Jan. 1, 2005, pp. 612-621, XP019027392, ISBN: 987-3-540-31219-2, the whole document.

Connor P C et al: "Identifying distinguishing size and shape features of mine-like objects in sidescan sonar imagery" Electrical and Computer Engineering, 2004. Canadian Conference on Niagara Falls, Ont., Canada May 2-5, 2004, Piscataway, NJ, USA, IEEE, US, May 2, 2004, pp. 1263-1267 vol. 3, XP010734349, ISBN: 978-0-7803-8253-4, abstract; figures 1-5; tables 1-8, * secs. 3.1 and 3.2 *.

Blackman S S: "Multiple hypothesis tracking for multiple target tracking" IEEE Aerospace and Electronic Systems Magazine, IEEE Service Center, Piscataway, NJ, US, vol. 19, No. 1, Jan. 1, 2004, pp. 5-18, XP011106326, ISSN: 0885-8985.

Duta N et al: "Automatic Contruction of 2D Shape Models" IEEE Transactions on Pattern Analysis and Machine Intelligence, IEEE Service Center, Los Alamitos, CA, US, vol. 23, No. 5, May 1, 2001, pp. 433-446, XP001108299, ISSN: 0162-8828.

Notification and International Preliminary Report on Patentability with Written Opinion of the International Searching Authority for PCT/US2008/057423, dated Oct. 8, 2009, 9 pages.

Mignotte, et al., "Unsupervised Hierarachical Markovian Segmentation of Sonor Images", IRISA/INRIA, Campus Universitair de Beaulieu, 35042 Rennes cedex, France, 1997. 4 pages.

Mignotte, et al., "Three-Class Markovian Segmentation of High Resolution Sonar Images", Computer Vision and Image Understanding, vol. 76, No. 3, Dec. 1999, pp. 191-204.

Reed, et al., "An Automatic Approach to the Detection and Extraction of Mine Features in Sidescan Sonar", IEEE Journal of Oceanic Engineering, vol. 28, No. 1, Jan. 2003, pp. 90-105.

Mignotte, et al., "Sonar Image Segmentation Using an Unsupervised Hierarchical MRF Model", IEEE Transactions on Image Processing, vol. 9, No. 7, Jul. 2000, pp. 1216-1231.

Notification of transmittal of the International Search Report dated Feb. 7, 2008 for PCT/2008/057423.

The International Search Report dated Feb. 7, 2008 for PCT/2008/057423.

Written Opinion of the International Searching Authority dated Feb. 7, 2008 for PCT/2008/057423.

File downloaded from U.S. Appl. No. 12/049,791, filed Mar. 17, 2008, file through Dec. 9, 2009, 126 pages.

U.S. Appl. No. 12/049,791, filed Mar. 17, 2008, from Dec. 9, 2009 to Aug. 22, 2012, 352 pages, Part 1.

U.S. Appl. No. 12/049,791, filed Mar. 17, 2008, from Dec. 9, 2009 to Aug. 22, 2012, 118 pages, Part 2.

U.S. Appl. No. 12/049,791, filed Mar. 17, 2008, from Dec. 9, 2009 to Aug. 22, 2012, 415 pages, Part 3.

* cited by examiner

Identification Performance
of tail of mine

| Correct + :<br>115 of 126<br>(91.3%) | False + :<br>1 of 29<br>(3.4%) |
|---|---|
| False - :<br>11 of 126<br>(8.7%) | Correct - :<br>28 of 29<br>(96.6%) |

— 282

Identification Performance
of head of mine

| Correct + :<br>111 of 126<br>(88.1%) | False + :<br>7 of 29<br>(24.1%) |
|---|---|
| False - :<br>15 of 126<br>(11.9%) | Correct - :<br>22 of 29<br>(75.9%) |

286

Identification Performance
of entire mine

| Correct + :<br>112 of 126<br>(88.9%) | False + :<br>4 of 29<br>(13.8%) |
|---|---|
| False - :<br>14 of 126<br>(11.1%) | Correct - :<br>25 of 29<br>(86.2%) |

— 284

Identification Performance a
portion of the tail of the mine

| Correct + :<br>123 of 133<br>(92.5%) | False + :<br>5 of 29<br>(17.2%) |
|---|---|
| False - :<br>10 of 133<br>(7.5%) | Correct - :<br>24 of 29<br>(82.8%) |

288

*FIG. 9*

IDENTIFYING WHETHER A CANDIDATE OBJECT IS FROM AN OBJECT CLASS

RELATED APPLICATIONS

This patent application claims priority to Application Ser. No. 60/896,636, filed Mar. 23, 2007 entitled "OBJECT IDENTIFYING" which is incorporated herein in its entirety.

BACKGROUND

Traditionally, mine detection using sonar imagery has used image processing and detection methods that often rely on preset segmentation and predetermined feature extraction methods followed by classification methods (e.g., neural networks, Bayesian networks and so forth). These classification methods have the disadvantage of not providing good detection or classification accuracy.

SUMMARY

In one aspect, a method to identify whether a candidate object is from an object class includes receiving an image of the candidate object and projecting the received image onto an image subspace. The image subspace is formed from images of known objects of a class. The method also includes determining whether the candidate object is in the object class based on the received image and the image subspace using a likelihood ratio. The likelihood ratio includes a first probability density indicating a probability an object is in the object class and a second probability density indicating a probability an object is not in the class. The first probability density and the second probability are each a function of a distance of the received image to the image subspace.

In another aspect, a method to identify whether a candidate object is a mine includes receiving a sonar image of a candidate object, projecting the received image onto a mine image subspace, the mine image subspace being formed from sonar images of known mines and determining whether the candidate object is a mine based on the received image and the mine image subspace using a likelihood ratio including a first probability density indicating a probability an object is a mine and a second probability density indicating a probability an object is not a non-mine. The first probability density and the second probability density are each a function of a distance of the received image to the mine image subspace.

In a further aspect, an article includes a machine-readable medium that stores executable instructions to identify whether a candidate object is a mine. The instructions cause a machine to receive images from known mines, perform shape normalization on the received images of known mines, generate a mine image subspace from the shape normalized mine images, receive the sonar image of a candidate object, performing shape normalization of the received sonar image, project the received image onto the mine image subspace, the mine image subspace being formed from sonar images of known mines and determine whether the candidate object is a mine based on the received image and the mine image subspace using a likelihood ratio including a first probability density indicating a probability an object is a mine and a second probability density indicating a probability an object is not a non-mine. The first probability density and the second probability density are each a function of a distance of the received image to the mine image subspace.

In a still further aspect, an apparatus to identify whether a candidate object is a mine includes circuitry to receive images from known mines, store each received image as a polygon having vertices, perform shape normalization on the received images of known mines, generate a mine image subspace from the shape normalized mine images, receive the sonar image of a candidate object, perform shape normalization of the received sonar image, project the received image onto the mine image subspace, the mine image subspace being formed from sonar images of known mines and determine whether the candidate object is a mine based on the received image and the mine image subspace using a likelihood ratio including a first probability density indicating a probability an object is a mine and a second probability density indicating a probability an object is not a non-mine. The first probability density and the second probability density are each a function of a distance of the received image to the mine image subspace.

DESCRIPTION OF THE DRAWINGS

FIG. 9 depicts tables for using different vertices of the mine polygon to determine if the candidate object is a mine.

DETAILED DESCRIPTION

In contrast to prior art techniques, described herein is an approach to identifying mines; however, this approach may be applied to identifying objects other than mines.

Figure 1:
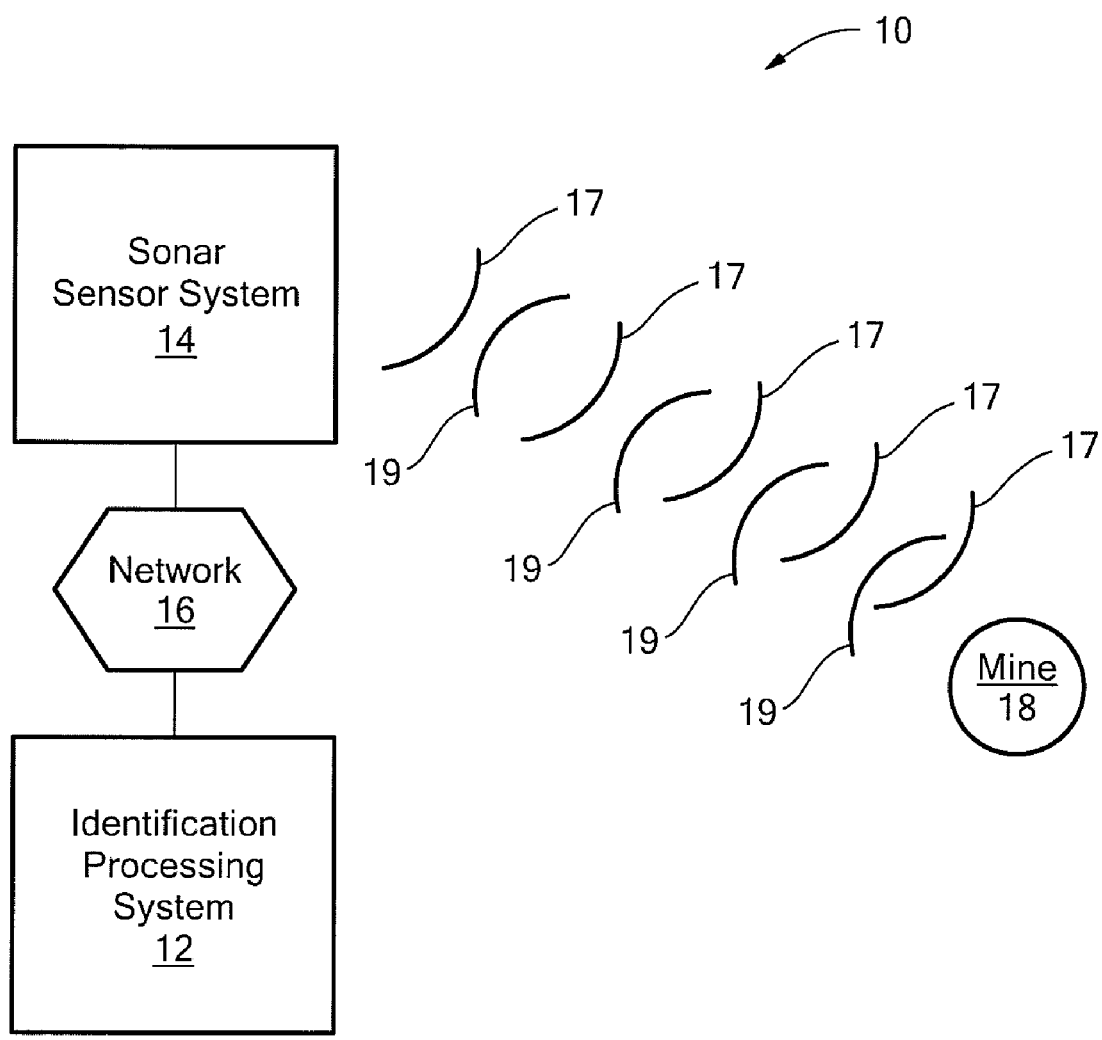
FIG. 1 is a block diagram of an example of a mine detection system.

Referring to FIG. 1, a mine identification system 10 includes an identification processing system (IPS) 12 and a sonar sensor system 14 connected to the IPS by a network 16. The sonar sensor system 14 sends sonar signals 17 that are reflected off an object such as a mine 18. The sonar sensor system 14 detects the object based on the reflected signals 19 received from the object. The IPS 12 determines if the detected object is a mine.

In one example, the sonar sensor system 14 may include one or more sonar sensors, such as sonar buoys. In another example, the sonar sensor system 14 is a sonar sensor located aboard a submarine. In one example, the network 16 is a wireless network.

The IPS 12 may be located on a ground-based platform (e.g., in a building, in a vehicle and so forth), a space-based platform (e.g., a satellite, a space-vehicle and so forth), a sea-based platform (e.g., a ship, a submarine, a buoy, an anchored sea structure, a torpedo, an undersea robot vehicle and so forth) or on an air-based platform (e.g., an aircraft, a helicopter, a missile and so forth).

In one example, the IPS 12 may be co-located (i.e. on the same platform) with the sonar sensor system 14. In other examples, the IPS 12 is not co-located with the sonar sensor system 14.

Figure 3:
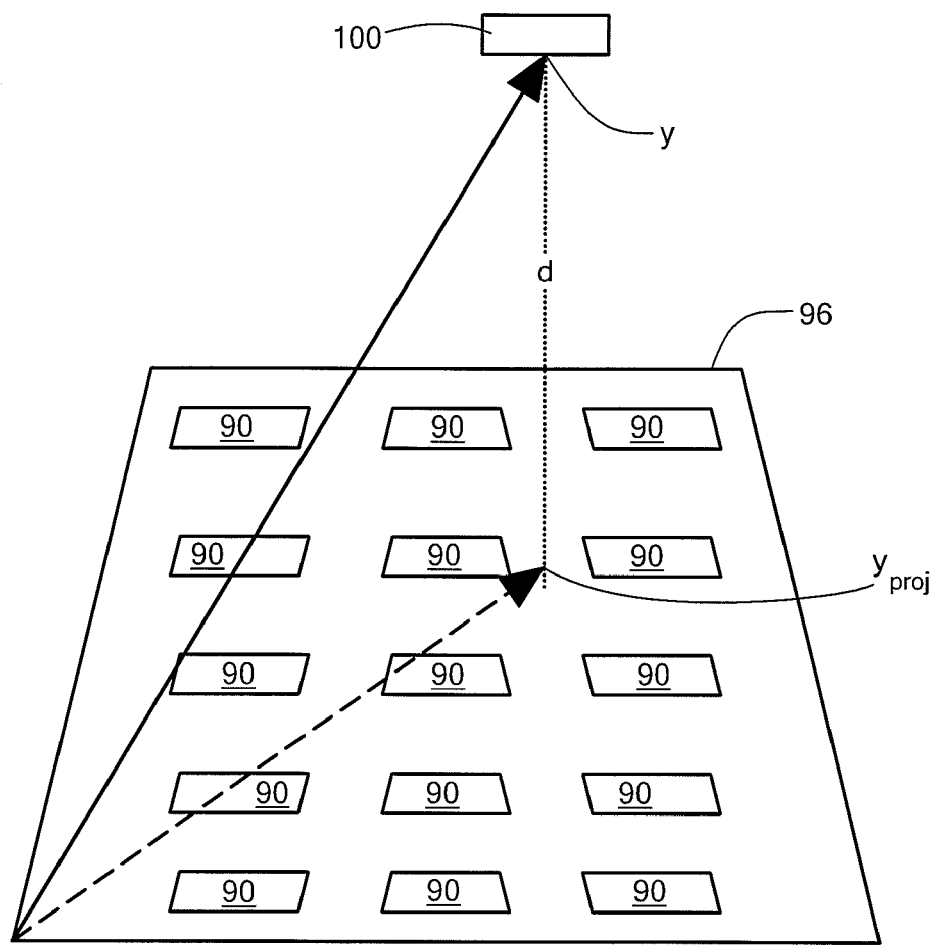
FIG. 3 is a representation of determining a distance between a candidate mine image patch associated with a candidate object and its projection onto a mine image subspace.

As will be shown below, a received image of a candidate object is converted to a candidate mine image patch which is used to determine whether the candidate object is a mine or not based on a mine image subspace formed from mine image patches of known mines. In particular, a distance, d, is determined between a candidate mine image patch 100 (FIG. 3) and a mine image subspace 96 (FIG. 3). The closer the candidate mine image patch 100 (FIG. 5) is to the mine image subspace 96 (FIG. 3), the greater likelihood that the candidate object is a mine.

Figure 2:
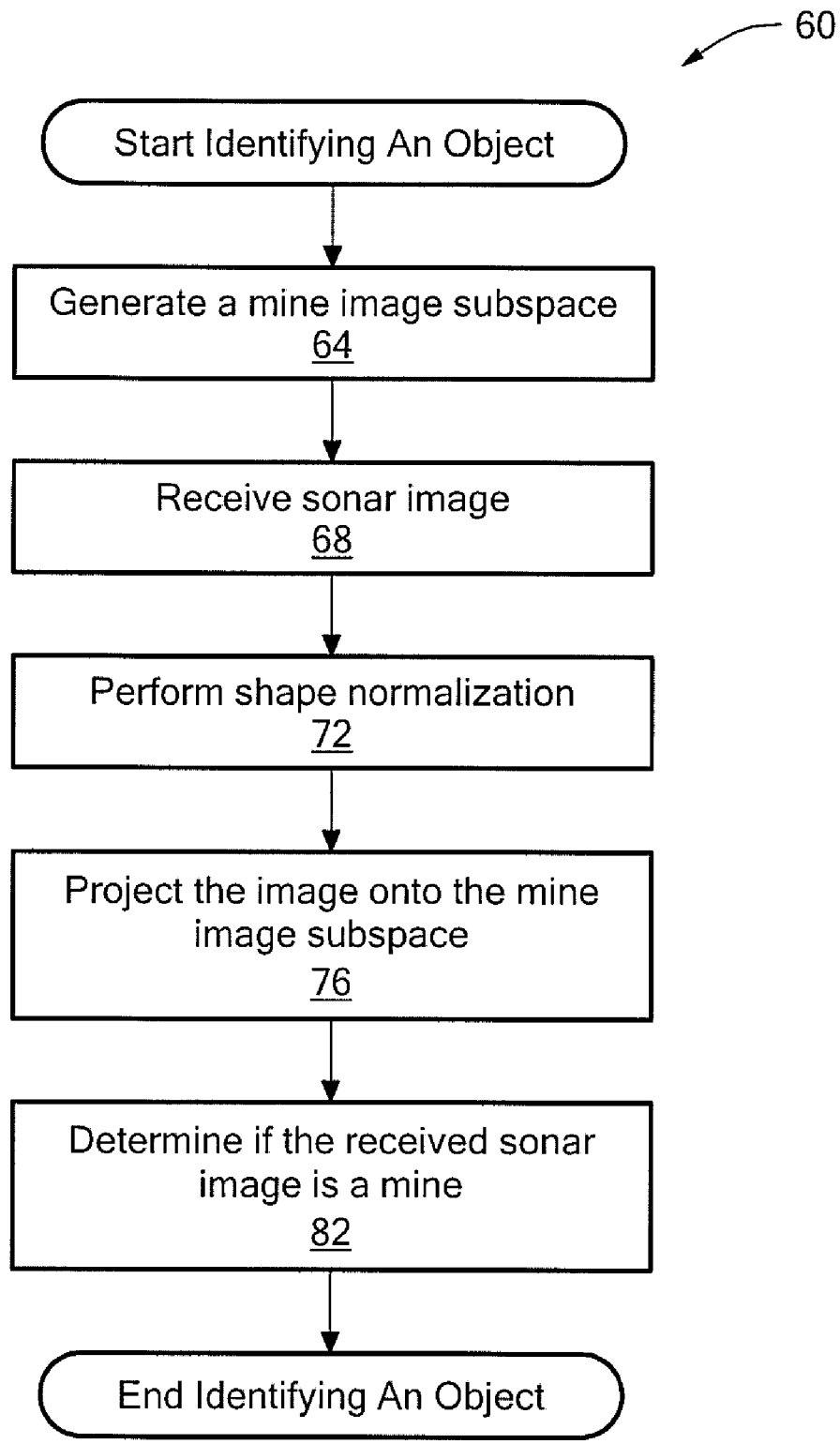
FIG. 2 is a flowchart of an example of a process to identify mines.

Referring to FIG. 2, a process 60 is an example of a process to identify an object and in particular identifying whether an object is a mine. Process 60 generates a mine image subspace (64). The mine subspace is formed using a set of known mines. For example, a set of known mines is used to record their sonar images. Each item in the set of known mines is saved as a mine image patch. The mine image subspace is used instead of the entire real image space because the mine image subspace is much smaller space than the real image space so that using a mine image subspace reduces processing time.

The following is mathematical support that a mine image subspace, in particular an eigen-subspace (based on eigenvalues and eigenvectors), may be used to model mines rather than using an entire space of images. For example, let an image, M(x,y), be a two-dimensional N by N array of intensity values, that is, a vector of dimension $N^2$. Mine image patches are treated as squares for the sake of simplicity here, although generally mine images are "shape-normalized" to rectangular grid dimensions of 32 by 128, describing a vector of dimension 4096. Of note is that the shape-normalized images of mines, being similar in overall configuration, will not be randomly distributed in this high dimensional space but instead form a smaller subspace. Principal Components Analysis (PCA) may be used to identify a small number of basis vectors that best capture the distribution of mine images within the larger image space.

Let $\{M_i\}_{i=1...T}$ with $M_i \in \Re^{N^2}$ be a sample set of normalized mine images. The mean mine image from the set is defined by $$\psi = \frac{1}{T} \sum_k M_k$$

where T is the number of data points. Each mine image deviates from the average by $m_i = M_i - \psi$. PCA is applied to the mean subtracted set described by $\{m_i\}_{i=1...T}$ in search for a set of orthonormal basis vectors $\{u_i\}_{i=1...T}$ and associated eigenvalues $\{\lambda_i\}_{i=1...T}$ that optimally, in a least squares sense, describe the distribution of the random variable $m \in \Re^{N^2}$. The basis vectors $u_i$ and scalars $\lambda_i$ are eigenvectors and eigenvalues of the covariance matrix described as $$C = \frac{1}{T} \sum_k m_i m_i^*$$
$$= AA^*$$

where $A = [m_1\ m_2\ m_3\ ...\ m_n]/\sqrt{T}$ is a block compositional matrix whose column i corresponds to vector $m_i$ and $A^*$ is the conjugate transpose of the matrix A. The covariance matrix C is an $N^2 \times N^2$ matrix. Note that eigenvector computation for this size matrix is not a computationally feasible task. However, assuming that the number of data points T in the sample space is far less than $N^2$, the covariance matrix will have a maximum of T-1 distinct and meaningful eigenvectors.

Now consider the eigenvectors $v_i$ of $A^*A$ such that $A^*Av_i = \mu_i v_i$. Pre-multiplying both sides by A results in $AA^*Av_i = \mu_i Av_i$, from which $u_i = Av_i$ are the eigenvectors of the original Covariance matrix $C = AA^*$. Thus, an alternative matrix $L = A^*A$ may be constructed and the T eigenvectors $v_i$ of L may be determined. This transposition analysis reduces the computation from an intractable task to a feasible task. In reality the number of samples is far smaller than the dimension of the image space, so this is a useful step in image-based eigenspace analysis.

For example, if the eigen-subspace is represented as $U_n$ where n is the number of dimensions and the total space is represented by $\Re^m$ where m is the number of dimensions, then $U_n \subset \Re^m$ and n<<m. Thus, eigenvectors of L span a basis set which describe the normalized mine images. For example, of this set, picking the top 8 eigenvectors (n=8) associated with the largest 8 eigenvalues forms a lower dimensional subspace $U_8$ to model the mine image subspace than the total space.

Based on the preceding mathematical support above for using a mine image subspace rather than the entire higher dimensional space, the mine image subspace may be constructed using known images of mines.

Referring back to FIG. 2, process 60 receives a sonar image (68). For example, the identification processing system 12 receives a sonar image from the sonar sensor system 14 containing an unidentified object.

Process 60 performs shape-normalization on the received image (72). For example, IPS 12 normalizes the shape of the received image to fit within the boundaries of a mine image patch (see, FIG. 4, for example) to form the candidate mine image patch 100 (FIG. 5).

Process 60 projects the candidate mine image patch onto the mine subspace (76). In one example, the candidate mine image patch 100 (FIG. 3) is projected onto the mine image subspace 96 having an 8-dimensional eigenspace components:

$$w_j = u^*_j(y - \psi), \text{ for } j = 1, \ldots, 8$$

Process 60 determines if the candidate mine image patch includes a mine (82). In one example, the candidate mine image patch 100 and the mine subspace image 96 are used to determine if the received image includes a mine (FIG. 3).

Figure 4:
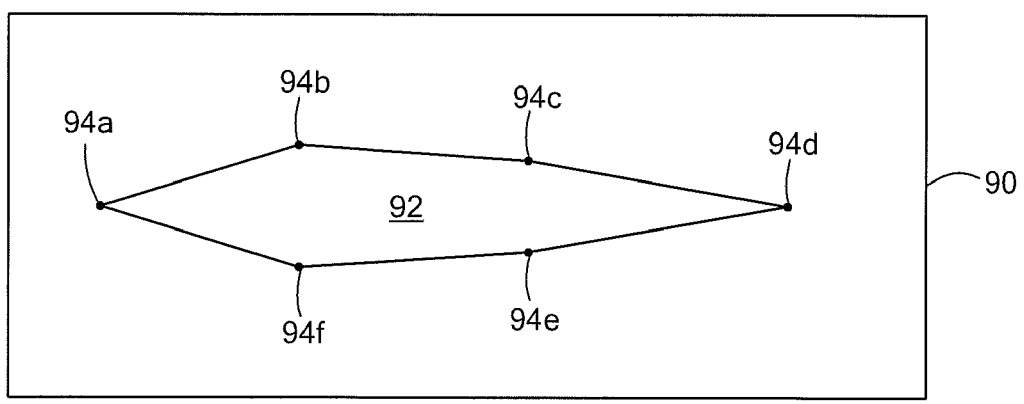
FIG. 4 is an example of a mine image patch.
Figure 5:
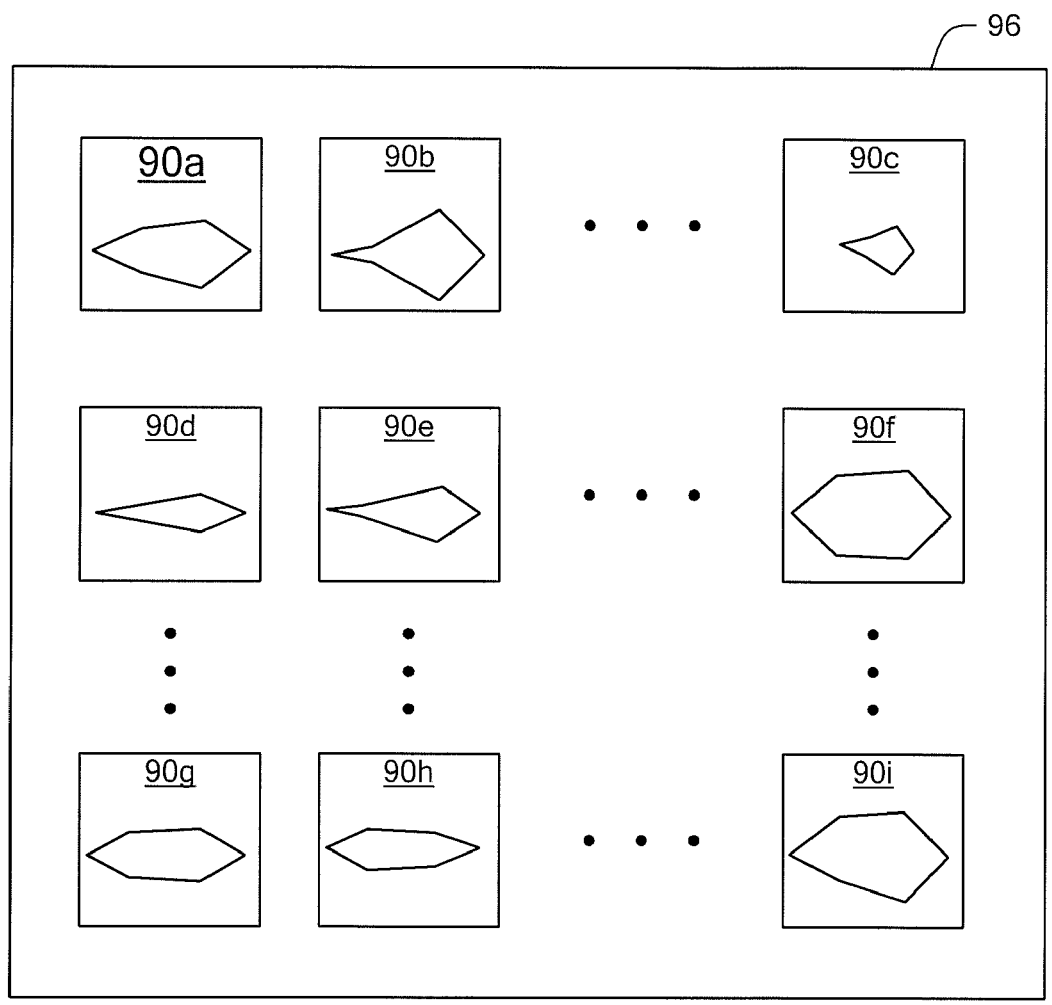
FIG. 5 is an example of a representation of the mine image subspace having mine image patches.

Referring to FIG. 4, in one example, a mine image patch 90 includes a polygon 92 representing a mine and having vertices, for example, six vertices (a vertex 94a, a vertex 94b, a vertex 94c, a vertex 94d, a vertex 94e and a vertex 94f). In this example, the vertices 94a, 94b, 94f form the head of the mine while the vertices 94b-94f form a tail of the mine. In other embodiments, a mine may be represented by any polygon having three or more vertices.

In one example, the set of known mines is generated using side-scan sonar images of actual mines. Side scan refers to scan configuration where the sonar sensor is along a horizontal strip on the side of the under water vehicle. In one particular example, over two hundred mine images are identified and segmented out of a set of sonar imagery. Each mine image is shape-normalized and hand-annotated with the six vertices 94a-94f describing a convex polygonal shape of the mine contained within the mine patch 90. The shape-normalized mine patches are used to construct the mine image subspace.

One example of a mine image subspace representation is a mine image subspace 96 having mine image patches 90a-90i shown in FIG. 3.

Figure 6:
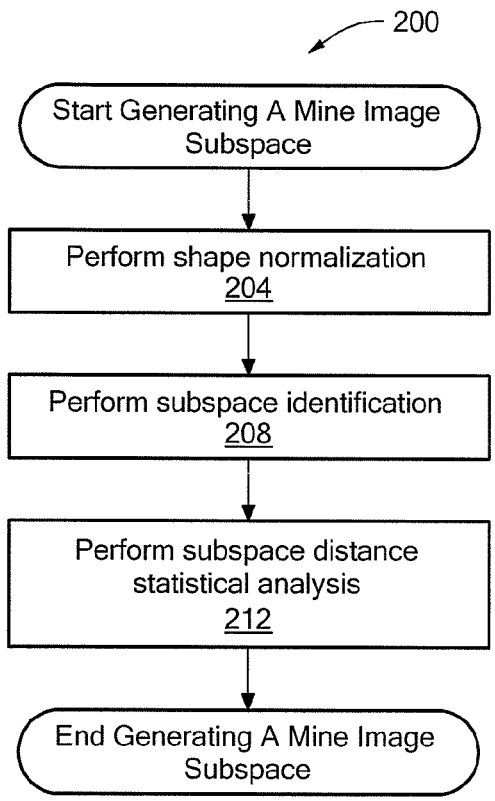
FIG. 6 is a flowchart of an example of a process to generate the mine image subspace.

Referring to FIG. 6, a process 200 is one example to generate a mine image subspace in processing block 64 (see FIG. 2). Process 200 performs shape normalization (204). For example, the side-scan sonar imagery for each known mine is centered with a uniform area, for example, a rectangle or square, which is the boundary of the mine image patch. In one example, each mine is morphed into fitting within the boundaries of a mine image patch 90 (FIG. 4). For example, an elongated mine that extends beyond the boundary of the mine image patch may be morphed to appear wider in order to fit with the boundaries of the mine image patch.

In another example, each mine is shaped as a polygon. In one example, the mine has six vertices 94a-94f (FIG. 4). In other examples, the mine may be described using more or less than six vertices. In further examples, a subset of the vertices may be used such as the vertices describing the tail of the mine or the vertices that describe the head of the mine.

Process 200 performs subspace identification (208). For example, a distribution is determined from a collection of known mine image patches. By determining the distribution, it is possible to determine what subspace from the entire image space mine image patches occupy. This subspace becomes the mine image subspace.

Process 200 performs subspace distance statistical analysis (212). For example, a distance threshold is determined by measuring statistics between image patches that are known to be mines and image patches that are known not to be mines to determine a distance threshold. As will be shown below, a distance between a candidate mine image patch 100 and the mine image subspace determines the likelihood that the candidate mine image patch contains a mine. For example, moving closer towards the mine image subspace from a far distance, what distance do objects identified as non-mines become identified as mines. In one example, a probability density is determined that the object is a mine and a probability distance is determined that the object is a non-mine, each probability density is a function of distance from the mine image subspace 96.

Figure 7:
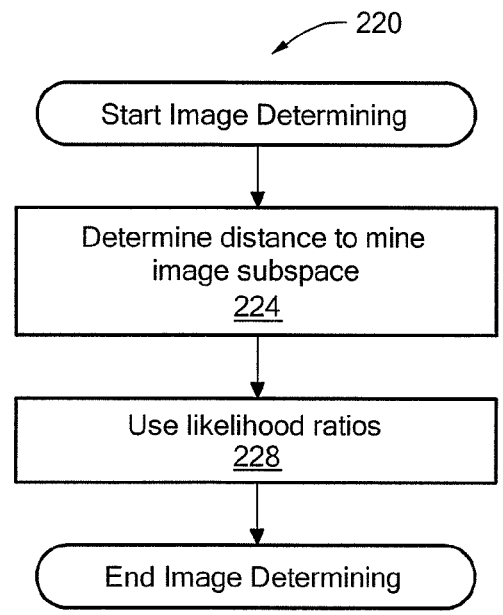
FIG. 7 is a flowchart of an example of a process to determine if the candidate mine image patch is a mine.

Referring to FIG. 7, a process 220 is one example of a process to determine a distance of the candidate image patch 100 to the mine image subspace 96 (224). For the candidate mine image patch 100 (FIG. 3), the vector representation, $\Omega=[w_1, w_2, w_3, \ldots, w_8]^T$, may be used to determine the distance of the candidate mine image 100 to the mine image subspace 96.

For example, referring to FIG. 3, consider, y, representing a point in space of the candidate mine image patch 100 where $y \in \Re^m$ and consider, $y_{proj}$, representing a point on the image mine subspace where the candidate image is projected and where $y_{proj}=$ $$\sum_{1}^{n} [y_1, u_k] u_k$$

where $u_k \in \Re^m$, $u_k$ is an eigenvector and k is the index.

The candidate mine image 100 is separated from the mine subspace 96 by a distance, d. The distance, $d=\|y-y_{proj}\|$, provides a good measure of determining whether the candidate mine image patch 100 contains a mine or not. For example, if the distance is small then there is a higher likelihood that the candidate mine image patch 100 contains a mine. Likewise, a very large distance indicates a less likelihood that the candidate mine image patch 100 contains a mine.

Figure 8:
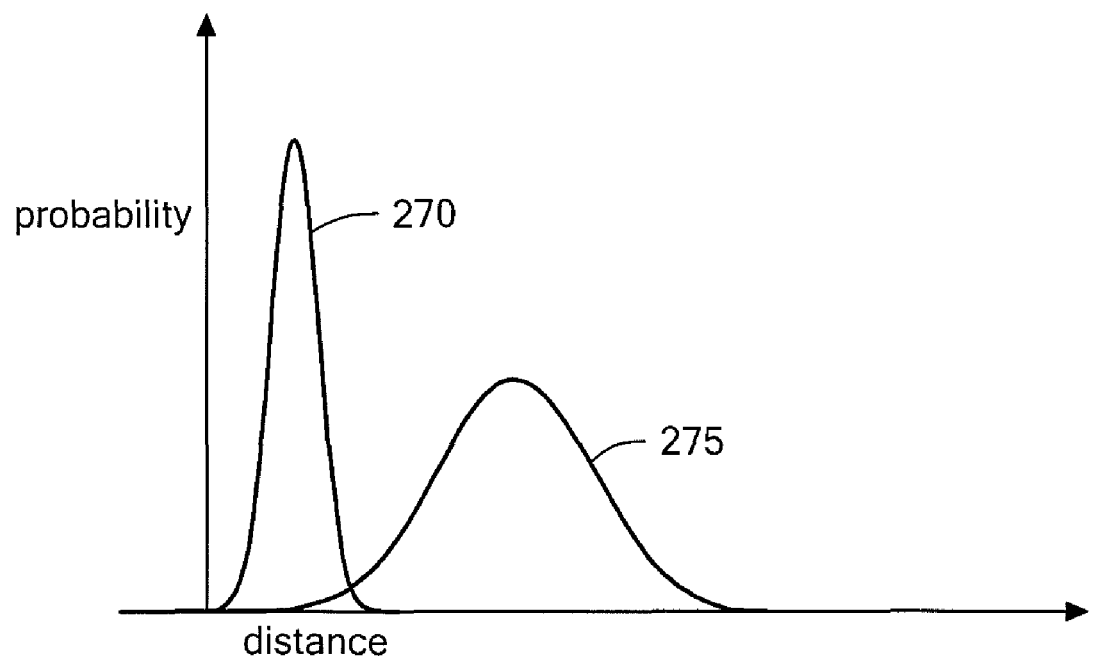
FIG. 8 is a diagram showing probability density curves of an object being a mine and an object not being a mine.

Referring FIGS. 7 and 8, process 220 uses likelihood ratios (228). The probability density for a mine, $\pi_\Theta(d)$, is depicted in a curve 270 and the probability density for a non-mine, $\pi_{\Theta'}(d)$, is depicted in a curve 275, where $\pi_\Theta(d)$ and $\pi_{\Theta'}(d)$ are functions of the distance of the candidate mine image 100 from the mine subspace 96. If a likelihood ratio, $\pi_\Theta(d)/\pi_{\Theta'}(d)$, is greater than or equal to 1, the candidate object is more likely to be a mine and if the likelihood ratio is less than 1 then the candidate object is more likely not a mine.

One difference between the approach described herein and the prior art is that the features, such as the shapes of polygons and image pixel content (colors) corresponding to within those polygonal regions, and model for a mine is determined directly from the known mine image data. Therefore, the selected features and the model are optimal in the sense that they best represent a given data set (e.g., a particular mine); whereas pre-fixed features and models may be optimal in a general sense but not for a particular data set (e.g., a particular mine). The approach previously described, which extends the process of modeling with the addition of shape parameterization, has the advantage of better modeling appearance variations due to changing mine geometry and thereby improving the detection/classification accuracy.

Referring to FIG. 9, as shown above determining a mine using all six vertices 94a-94f (FIG. 3) may not be the most optimal solution. For example, using some of the vertices may generate different results. In one experiment shown in table 282, using five vertices 94b-94f that make-up the tail of a mine yielded a correct positive of 91.3%, a false positive of 3.4%, a false negative of 8.7% and a correct negative of 96.6%. In a second experiment shown in table 284, using all six vertices 94a-94f that make-up the mine yielded a correct positive of 88.9%, a false positive of 13.8%, a false negative of 11.1% and a correct negative of 86.2%. In a third experiment shown in table 286, using three vertices 94a, 94b, 94f that make-up the head of the mine yielded a correct positive of 88.1%, a false positive of 24.1%, a false negative of 11.9% and a correct negative of 75.9%. In a fourth experiment shown in table 288, using three vertices 94c-94e that make-up a portion of the tail of the mine yielded a correct positive of 92.5%, a false positive of 17.2%, a false negative of 7.5% and a correct negative of 82.8%.

Figure 10:
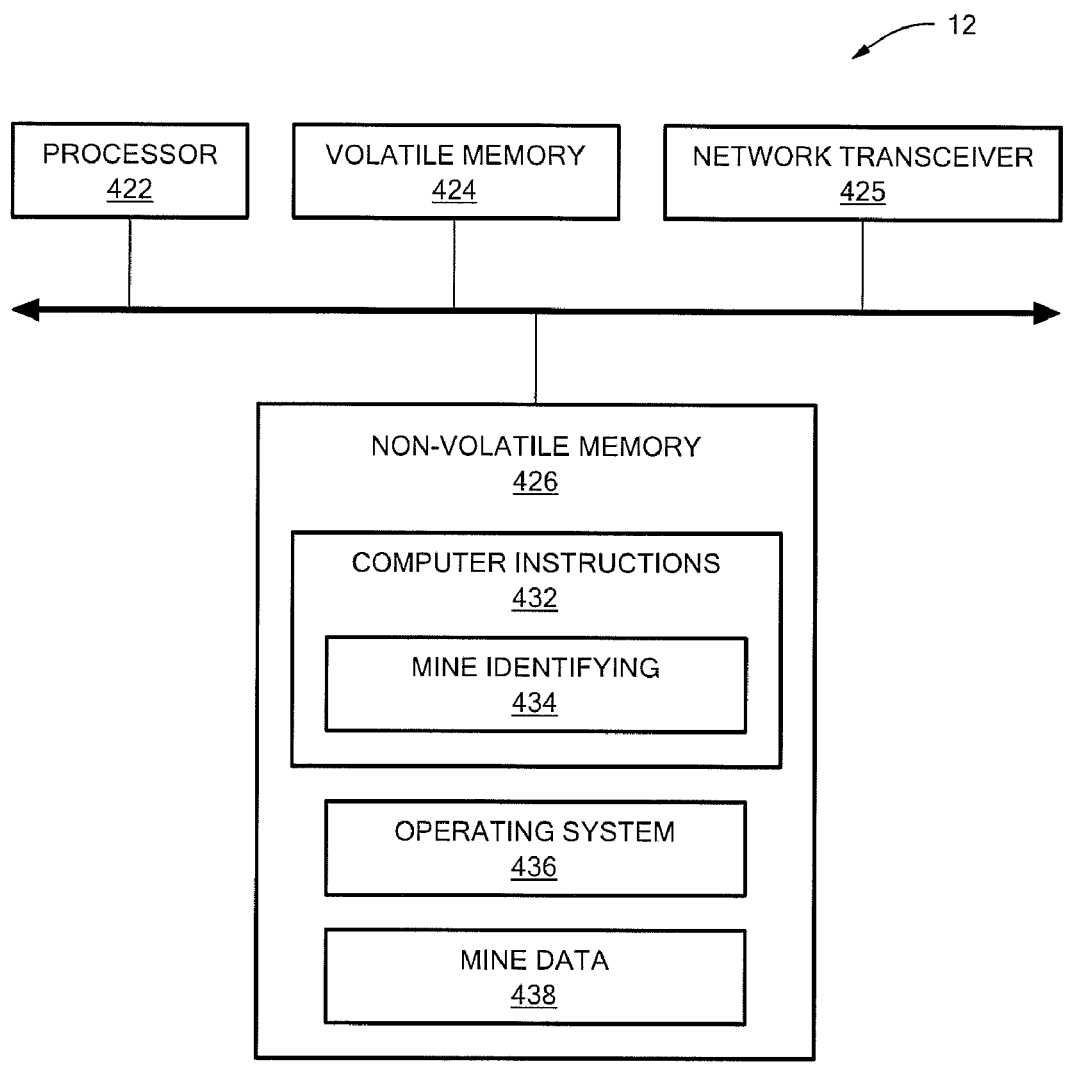
FIG. 10 is a block diagram of an example of an identification processing system used in mine identification.

FIG. 10 shows an example of the IPS 12 (FIG. 1). The IPS 12 includes a processor 422, a volatile memory 424, a non-volatile memory 426 (e.g., hard disk) and a network transceiver 425 to communicate with sensor system 14 through the network 16. Non-volatile memory 426 includes computer instructions 432, an operating system 436 and mine data 438. The computer instructions 432 included mine identifying instructions 434 which are executed out of volatile memory 424 to perform the process 60. In one example, the mine data 438 includes the mine image subspace 96.

Process 60 is not limited to use with the hardware and software of FIG. 10; it may find applicability in any computing or processing environment and with any type of machine or set of machines that is capable of running a computer program. Process 60 may be implemented in hardware, software, or a combination of the two. Process 60 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 60 and to generate output information.

The system may be implemented, at least in part, via a computer program product, (i.e., a computer program tangibly embodied in an information carrier (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 60. Process 60 may also be implemented as a machine-readable storage medium, configured with a computer program, where upon execution, instructions in the computer program cause the computer to operate in accordance with process 60.

The processes described herein are not limited to the specific embodiments described herein. For example, the processes are not limited to the specific processing order of FIGS. 2, 6 and 7, respectively. Rather, any of the processing blocks of FIGS. 2, 6 and 7 may be re-ordered, combined or removed, performed in parallel or in serial, as necessary, to achieve the results set forth above.

Even though FIG. 3 is shown in three dimensions, FIG. 5 is only a representation of a projection onto a mine image subspace with dimensions greater than 3. One skilled in the art would recognize that showing the actual representation is impossible.

The processing blocks in FIGS. 2, 6 and 7 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method to identify whether a candidate object is from an object class, comprising:
   receiving an image of the candidate object;
   projecting the received image onto an image subspace, the image subspace being formed from images of known objects of the object class; and
   determining whether the candidate object is in the object class based on the received image and the image subspace using a likelihood ratio, the likelihood ratio including a first probability density indicating a probability an object is in the object class and a second probability density indicating a probability an object is not in the object class,
   wherein the first probability density and the second probability density are each a function of a distance of the received image to the image subspace.

2. The method of claim 1, further comprising performing shape normalization on the received image.

3. The method of claim 1, further comprising:
   receiving images from the known objects from the object class;
   performing shape normalization on the received images of the known objects in the object class; and
   generating the image subspace from the shape-normalized received images of known objects in the object class.

4. The method of claim 3, further comprising storing each received image as a polygon having vertices.

5. The method of claim 4 wherein storing each received image as a polygon having vertices comprises storing each received image as a polygon having six vertices.

6. The method of claim 4 wherein generating the image subspace comprises generating the image subspace based on a subset of the vertices.

7. The method of claim 3 wherein generating the image subspace comprises generating an eigen subspace.

8. A method to identify whether a candidate object is a mine; comprising:
   receiving a sonar image of a candidate object;
   projecting the received image onto a mine image subspace, the mine image subspace being formed from sonar images of known mines; and
   determining whether the candidate object is a mine based on the received image and the mine image subspace using a likelihood ratio including a first probability density indicating a probability an object is a mine and a second probability density indicating a probability an object is not a non-mine,
   wherein the first probability density and the second probability density are each a function of a distance of the received image to the mine image subspace.

9. The method of claim 8, further comprising performing shape normalization of the received sonar image.

10. The method of claim 8, further comprising:
    receiving images from known mines;
    performing shape normalization on the received images of known mines; and
    generating the mine image subspace from the shape normalized mine images.

11. The method of claim 10, further comprising storing each received image as a polygon having vertices.

12. The method of claim 11 wherein storing each received image as a polygon having vertices comprises storing each received image as a polygon having six vertices.

13. The method of claim 11 wherein generating the image subspace comprises generating the image subspace based on a subset of the vertices comprising one of at least a portion of a head of the mine and at least a portion of a tail of the mine.

14. An article comprising:
    a non-transitory machine-readable medium that stores executable instructions to identify whether a candidate object is a mine, the instructions causing a machine to:
    receive images from known mines;
    perform shape normalization on the received images of known mines;
    generate a mine image subspace from the shape normalized mine images;
    receive the sonar image of a candidate object;
    perform shape normalization of the received sonar image;

project the received sonar image, which is shape normalized, onto the mine image subspace, the mine image subspace being formed from sonar images of known mines; and determine whether the candidate object is a mine based on the received image and the mine image subspace using a likelihood ratio including a first probability density indicating a probability an object is a mine and a second probability density indicating a probability an object is not a non-mine, wherein the first probability density and the second probability density are each a function of a distance of the received image to the mine image subspace.

15. The article of claim 14, further comprising instructions causing a machine to store each received image as a polygon having vertices.

16. The article of claim 15 wherein instructions causing a machine to store each received image as a polygon having vertices comprises instructions causing a machine to store each received image as a polygon having six vertices.

17. The article of claim 15 wherein instructions causing a machine to generate the image subspace comprises instructions causing a machine to generate the image subspace based on a subset of the vertices comprising one of at least a portion of a head of the mine and at least a portion of a tail of the mine.

18. An apparatus to identify whether a candidate object is a mine, comprising:
circuitry to:
receive images from known mines;
store each received image as a polygon having vertices;
perform shape normalization on the received images of known mines;
generate a mine image subspace from the shape normalized mine images;
receive the sonar image of a candidate object;
perform shape normalization of the received sonar image;
project the received image onto the mine image subspace, the mine image subspace being formed from sonar images of known mines;
determine whether the candidate object is a mine based on the received image and the mine image subspace using a likelihood ratio including a first probability density indicating a probability an object is a mine and a second probability density indicating a probability an object is not a non-mine,
wherein the first probability density and the second probability density are each a function of a distance of the received image to the mine image subspace.

19. The apparatus of claim 18 wherein the circuitry comprises at least one of a processor, a memory, programmable logic and logic gates.

20. The apparatus of claim 18 wherein circuitry to store each received image as a polygon having vertices comprises circuitry to store each received image as a polygon having six vertices.

21. The apparatus of claim 18 wherein circuitry to generate the image subspace comprises circuitry to generate the image subspace based on a subset of the vertices comprising one of at least a portion of a head of the mine and at least a portion of a tail of the mine.

* * * * *